Nov. 24, 1942.   S. H. PELTIER   2,302,886
MEANS FOR MOLDING GLASS ARTICLES
Filed Sept. 18, 1940   4 Sheets-Sheet 1
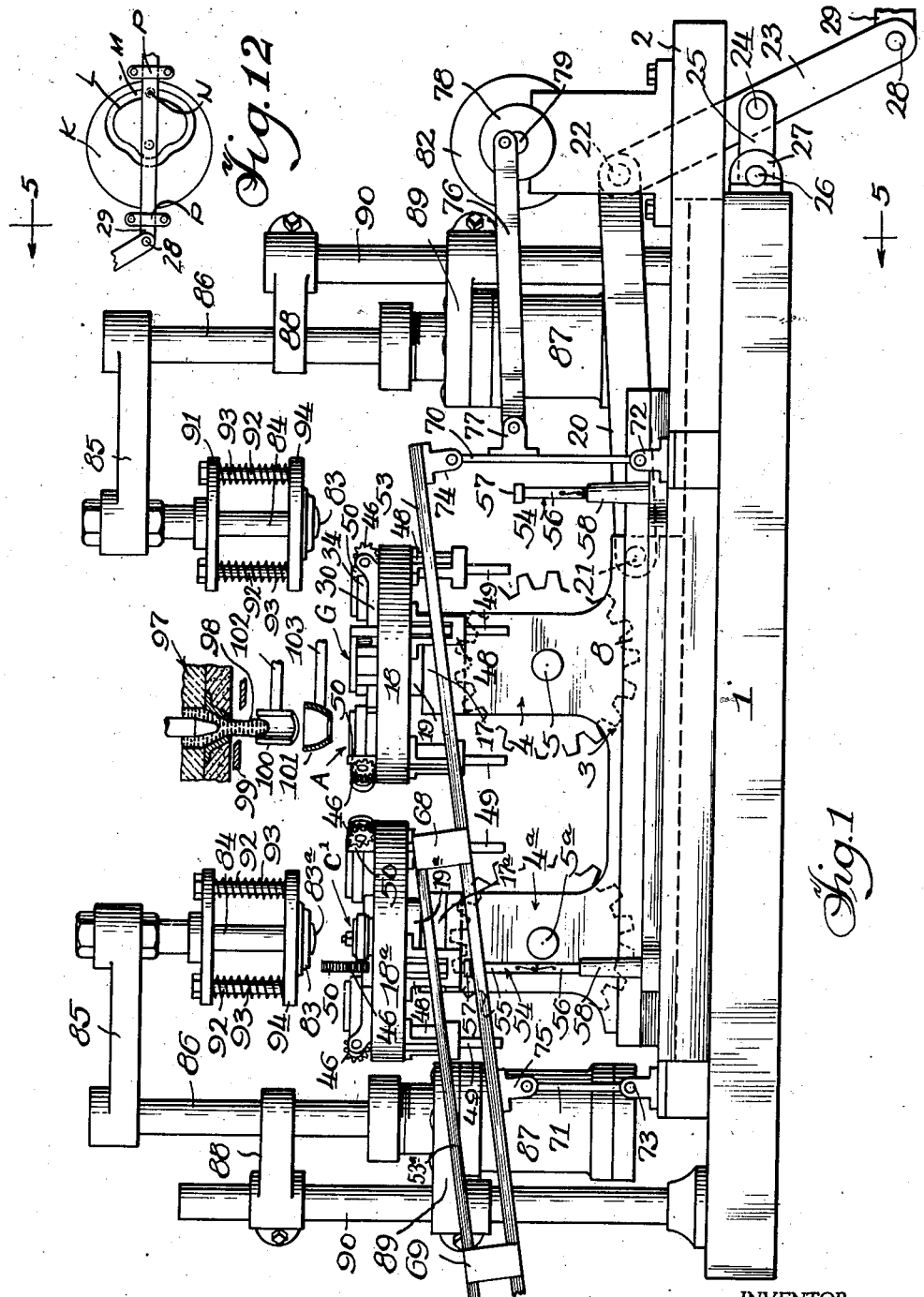
INVENTOR.
Sellers H. Peltier
BY Louis A. Bisson,
ATTORNEY.

Nov. 24, 1942. S. H. PELTIER 2,302,886
MEANS FOR MOLDING GLASS ARTICLES
Filed Sept. 18, 1940 4 Sheets-Sheet 2
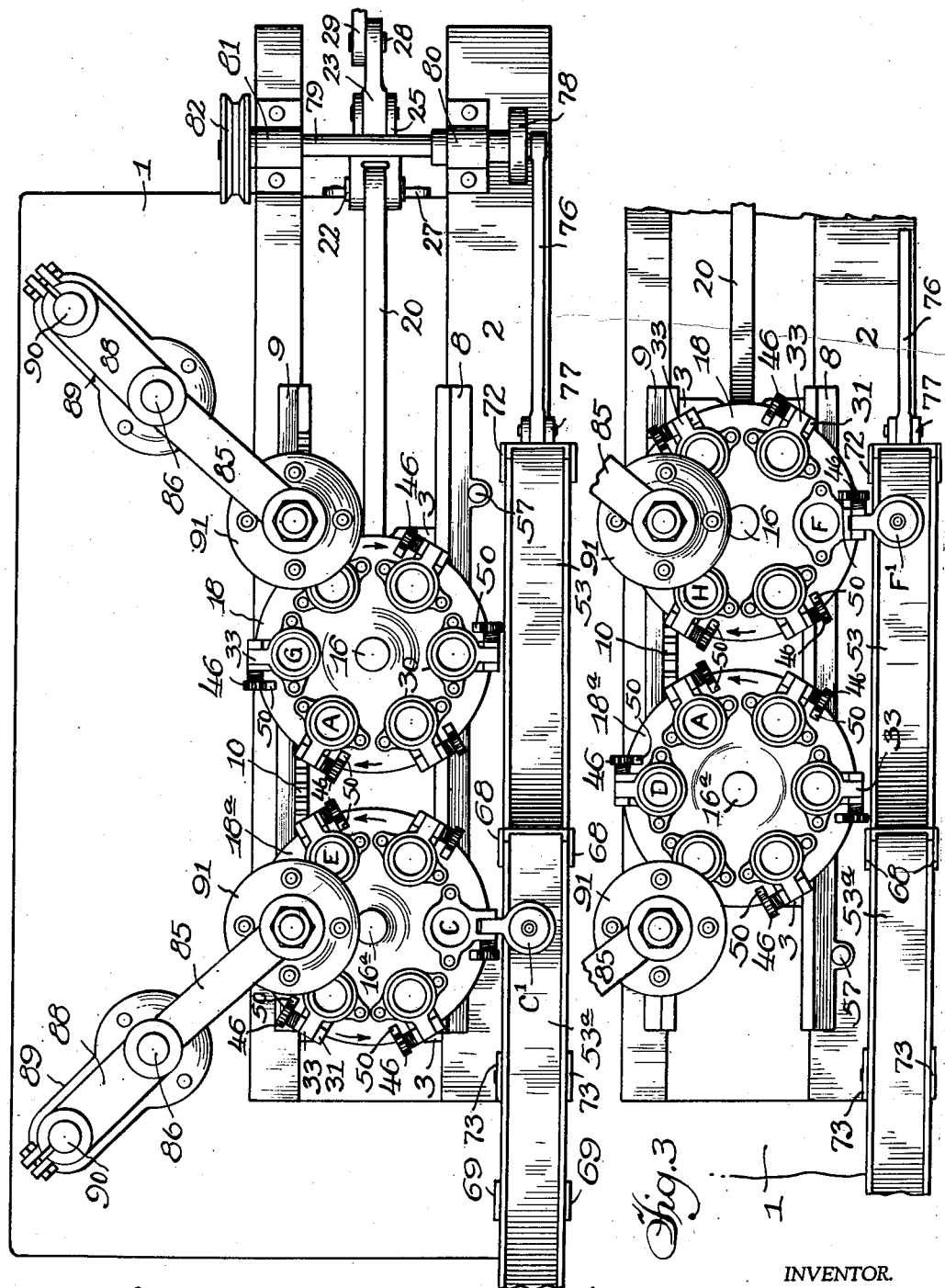
INVENTOR.
Sellers H. Peltier,
BY Louis A. Bisson,
ATTORNEY.

Nov. 24, 1942. S. H. PELTIER 2,302,886
MEANS FOR MOLDING GLASS ARTICLES
Filed Sept. 18, 1940 4 Sheets-Sheet 3

INVENTOR.
Sellers H. Peltier,
BY Louis A. Bisson,
ATTORNEY.

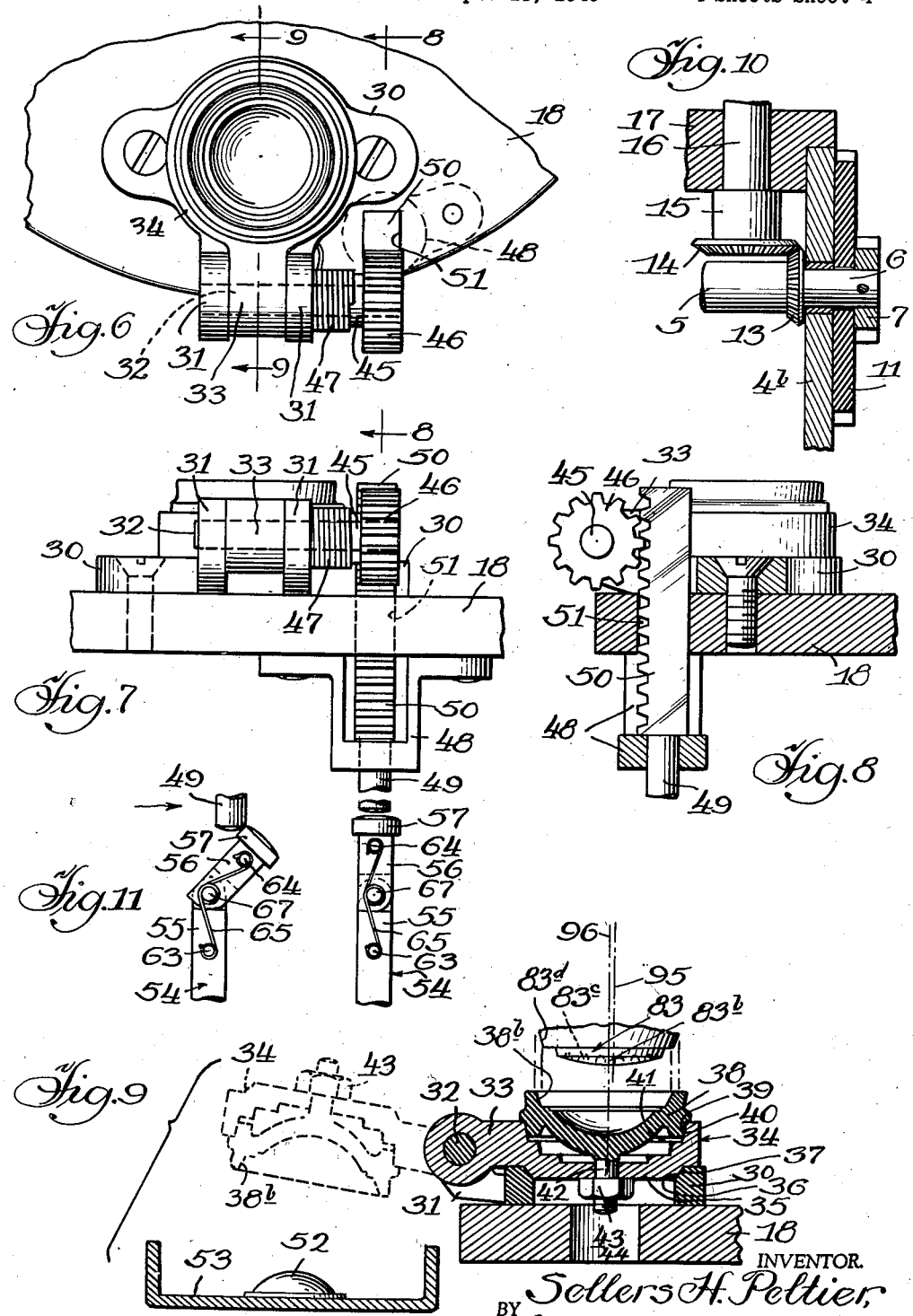

Patented Nov. 24, 1942

2,302,886

UNITED STATES PATENT OFFICE 2,302,886

MEANS FOR MOLDING GLASS ARTICLES

Sellers H. Peltier, Ottawa, Ill., assignor to The Peltier Glass Company, Ottawa, Ill., a corporation of Illinois Application September 18, 1940, Serial No. 357,189

10 Claims. (Cl. 49—5)

The present invention relates to means for automatically molding glass or like articles or objects from molten or plastic material.

Among the objects of the invention is to provide a novel means for moving in given time relation a plurality of series of molds, such as matrix molds, to and from a common mold charge feeding station, together with means for coordinately moving the series of molds to and from molding stations, whereby when a mold of a series is being fed with a fresh mold charge a mold of another series is at the molding station for the molding of the mold charge previously fed to it at the feeding station.

Another object of the invention is to provide novel means in association with each mold of each series for transferring or delivering the molded end product to a conveying means in given time relation coordinated with the molding of a successive mold charge in another mold of the series.

More particularly, the invention comprehends a reciprocating carriage actuated to have a dwell or rest period at each end of the reciprocatory stroke of the carriage, together with a plurality, such as two by way of illustration, of turntables rotatably supported on the reciprocating carriage, each of the turntables carrying a series of mold elements or parts, such as matrix mold parts, and means for turning the tables with predetermined angular movements in given time relation with the reciprocatory movements of the carriage. The latter means may comprise a slip-drive means which may be in the form of a rack and gear means, with overrunning clutches so related to the carriage and the turntables that in one stroke of reciprocatory movement of the carriage one of the turntables will be turned as it is being carried by the carriage, while another turntable is merely moved linearly with the carriage without turning, and vice versa, during the reverse stroke of the reciprocatory movements of the carriage. In this way the matrix mold of the series on the former table, which matrix mold has received a fresh mold charge at the feeding station, will be moved both by the turning movement of the turntable and its linear movement with the carriage to a molding station, that is, in alinement with a patrix type of mold part; while simultaneously a matrix mold of the series on the other or latter turntable, which matrix mold is empty, is moved linearly with its non-turning turntable and the carriage to the feeding station, that is, in alinement with the means for feeding a fresh mold charge. At the end of the stroke of the carriage during which there is a dwell or time rest, the molding of the mold charge in the former matrix mold occurs and simultaneously a fresh mold charge is fed to the latter matrix mold at the feeding station.

Also each matrix mold on each table has means for transferring or delivering the mold charge or article to suitable conveyor means. The transfer means preferably operates during the dwell or rest period at the end of each stroke of the reciprocatory movements of the carriage and turntables, and simultaneously with the molding at one or the other of the molding stations, which may be also at the same time as when feeding a fresh mold charge at the feeding station. Such transfer means may include rack and gear means associated with each matrix mold to swing the latter when the rack and gear means is operated. Also associated with each table at its outer dwell or rest position is a lifter means so located as to be directly under the rack and gear means of the matrix mold brought in position opposite the lifter means by a combined turning of the turntable and the movement of the carriage, at which time suitable time control means, such as pneumatic means, operates the lifting means which in turn actuates the rack and gear means to cause the matrix mold to swing and to drop the molded article carried by it onto the conveyor means.

While the patrix mold means is adjustably mounted on the machine so that they may be brought into substantial alinement with the matrix molds successively moved opposite them, in practice, due to certain tolerances of manufacture, it is difficult always to have all of the matrix molds of a series come exactly in axial coincidence with the corresponding patrix mold. Hence the present invention comprehends the providing of counterpart, tapered or beveled surface portions on the matrix and patrix molds so that as they approach each other in the molding function these tapered surface portions will contact at some point and mutually self-center themselves into exact coaxial relation before the actual molding of the mold charge starts, whereby a perfect and symmetrical article will be molded in the mold cavity between the molding surfaces of the matrix and patrix mold parts.

A further object of the invention is to provide novel means for simultaneously moving a mold part to a feeding station, another mold part to a molding station, and a further mold part to a transferring or delivering station, and in simultaneously feeding a mold charge at a feeding station, molding a mold charge at the molding station, and transferring or delivering a molded article at a transferring or delivering station.

The invention comprehends an automatic molding of glass articles by reciprocating a carriage with a given stroke and with dwell periods at the ends thereof, together with the carrying of spaced turntables rotatably carried by the carriage and with a circular series of matrix molds on each turntable, which molds travel in given paths below a given feeding locus above the turntables, the latter being spaced relative to the length of the stroke of the carriage to have the paths of movement of the series of the matrix mold respectively directly below the locus of the feeding means when the carriage is respectively at its ends of its reciprocatory stroke, together with spaced patrix type of molding means located respectively over the matrix mold paths of the respective turntables when the carriage is respectively at its ends of its reciprocatory stroke. In other words, the series of matrix molds are so moved and related to the stroke of the carriage as to successively pass through a given common point, namely, the locus of feeding, first a matrix mold of one series and then a matrix mold of the other series. Likewise the matrix mold of each series passes through the respective molding station of that series. Thus it will be seen that the invention having the twin units mentioned, besides being capable of producing pressed ware of any kind, has double production capacity and speed, while using but a single delivery station. Another advantage possessed by the present invention is that the molds to be charged are brought into direct vertical alinement with the feeder or delivery orifice so that the gob or mold charge will fall in a straight line and axially into the molds.

Other objects, advantages, capabilities, features, process steps, and the like, are comprehended by the invention as will later appear and as are inherently possessed by the invention.

Referring to the drawings:

Fig. 1 is a view in front elevation of the device embodying the invention.

Figs. 2 and 3 are top plan views of the same showing different stages of operation.

Fig. 6 is a fragmentary top plan view of part of the molding means on an enlarged scale.

Fig. 7 is a fragmentary elevational view of the means shown in Fig. 6.

Fig. 8 is a part sectional and part elevational view taken in a plane represented by line 8—8 in Figs. 6 and 7 of the drawings.

Fig. 9 is a sectional view taken in a plane represented by line 9—9 in Fig. 6 of the drawings.

Fig. 10 is a fragmentary sectional view on an enlarged scale of the turntable driving means.

Fig. 11 is a fragmentary elevational view of a detail shown in Fig. 7.

Fig. 12 is a fragmentary view in elevation of the cam means, on a reduced scale, effecting a dwell at the end of the stroke.

Figure 4:
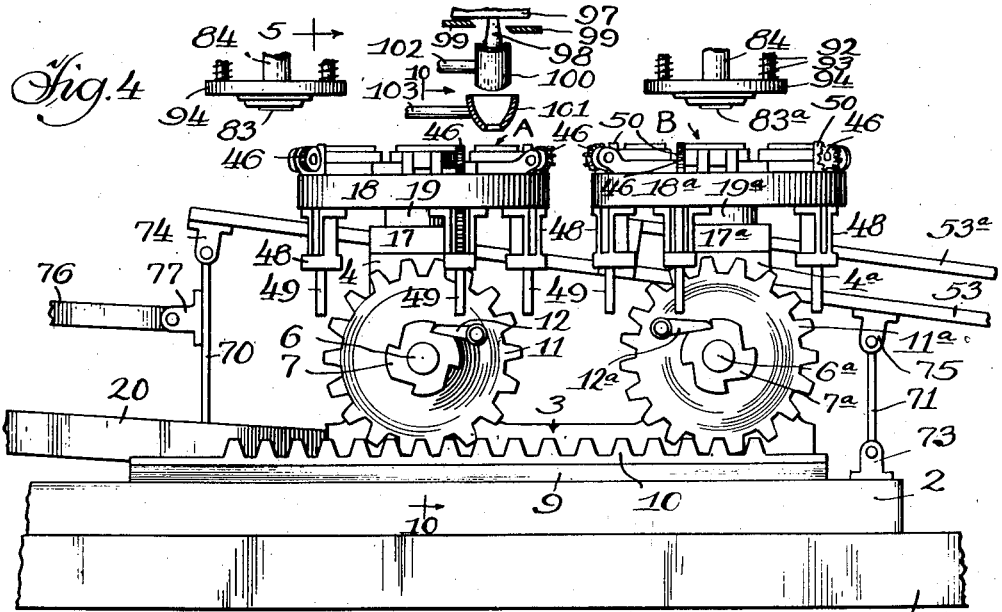
Fig. 4 is a fragmentary rear view in elevation of the same.

Referring more in detail to the drawings, the embodiment selected to illustrate the invention is shown in a machine having a base 1 supporting a guide track 2 suitably secured to the base 1. In the track 2 slidably reciprocates a carriage 3 having a pair of standards 4 and 4ᵃ each comprising spaced upright sides 4ᵇ and 4ᶜ (see Fig. 5), in which respectively is rotatably supported a shaft 5, 5ᵃ. Each of the latter has a protruding end portion 6, 6ᵃ to which is secured a ratchet wheel 7, 7ᵃ. Fixed upon the track 2 and located at the sides of the base portions of the carriage 3 are guide members 8 and 9. The top of the member 9 has rack teeth constituting a rack 10 with which operates spur gears 11 and 11ᵃ freely rotatable on the protruding shaft portions 6 and 6ᵃ respectively. These gears carry pivoted pawls 12 and 12ᵃ which are respectively operative with the ratchets 7 and 7ᵃ, the pawl 12 locking with the ratchet 7 in counterclockwise rotation of the gear 11, and the pawl 12ᵃ locking with the ratchet 7ᵃ in clockwise rotation of the gear 11ᵃ, as viewed in Fig. 4. Secured to each of the shafts 5 and 5ᵃ is a beveled gear 13 operative with a beveled gear 14 (see Figs. 5 and 10). Each of the gears 14 has a hub 15 fixed to a vertical shaft 16, 16ᵃ (see Figs. 2, 3 and 10) rotatable in head 17, 17ᵃ suitably secured to the upper end of the standards 4, 4ᵃ. To the upper end portions of shafts 16 and 16ᵃ are fixed turntables 18 and 18ᵃ respectively, these turntables having hubs 19 and 19ᵃ rotatably bearing on the heads 17 and 17ᵃ respectively.

At one end of the carriage is pivotally connected a link 20 by way of pivot means 21 for reciprocating the carriage, the other end of the link being pivotally connected by way of pivot means 22 to a lever 23 in turn fulcrumed by way of pivot means 24 at an end of a compensating link means 25 pivoted by way of pivot means 26 in bearing means 27 fixed to an end of the base 1, the other end of the lever 23 being pivoted by way of pivot means 28 to a reciprocating rod 29 suitably operatively connected to a cam K having a cam groove L of which portion M is a dwell part of the cam. In the cam groove extends a follower N in the form of a pin secured to the reciprocating rod 29 slidable in guides P. As the cam rotates the bar 29 is reciprocated according to the form of the cam groove, and while the dwell portion M of the groove is traveling past the pin N the slide bar 29 is at rest or dwell.

Each of the turntables carries a plurality of molding die means. In the illustrative embodiment shown there are six of these to each turntable. They are all alike and one is shown by way of example in detail in Figs. 6, 7, 8 and 9 of the drawings. It will be understood that the invention comprehends the using of any other number of these mold means per table, depending upon the size of such mold means. These mold means are arranged in a series to travel in circular paths as the turntable is turned or angularly moved.

Each of such means comprises a base plate 30 secured to the top of the turntable as by screws or other suitable mode of securement. The plate 30 has hinge lugs 31 carrying a hinge pin 32 rotatable in such lugs. Secured to the pin 32 between the lugs 31 is a lug 33 integral with a mold carrier 34 which, in the form of device chosen to illustrate the invention, is of annular form and has a plurality of different sized sockets for selectively accommodating different sized mold parts, but it is to be understood that such carrier may be of any desired shape to conform with the particular shape of mold part used. The base 35 of the carrier 34 is provided with a beveled seat 36 to seat properly on a counterpart beveled seat 37 on the base plate 30, as shown in Fig. 9. If when the carrier 34 is swung to seating position on the base plate 30 it should not be exactly centered, the bevels 36 and 37 when brought into mutual contact will cause a proper centering so that the carrier will seat firmly and in correct coaxial position.

A mold die part 38 of matrix type is shown by way of example. It is designed to mold colored glass lenses or the like as may be used in tail light devices on vehicles, or as reflectors, etc., and they are usually of red color but not limited thereto. The mold part 38 has a tapered seat 39 to fit with the tapered seat 40 on the carrier 34, which seats serve to properly center the mold part 38 on the carrier 34. In the form shown, the mold part 38 is seated in the upper socket 41. If a smaller mold part be used, it may be seated in a correspondingly sized lower socket provided in the carrier 34. The mold part 38 has a threaded stem 42 extending through an aperture in the base 35 of the carrier and to which a nut 43 is applied for securely holding the mold part 38 in place on the carrier 34. The turntable 18 also is provided with a suitable recess or hole 44 for affording clearance for the stem 41 and the nut 43.

The hinge pin or shaft 32 has an extension 45 (see Figs. 6 and 7) to which is fixed a spur gear 46, and between this gear and the lug 41 is a coil spring 47 so connected to the shaft extension 45 and the base plate lug 31 as to turn the shaft 32 and the connected carrier 34 with the mold part 38 all as a unit to seated position, as shown in full lines in Fig. 9, and to normally hold the same in such seated position.

To the under side of each turntable (see Fig. 7) are secured in any suitable manner a series of brackets or saddles 48, each of which slidably receives the shank 49 of a vertical rack 50 which is vertically slidable through a square or rectangular hole 51 provided in the turntable, and so located that the rack 50 will be in mesh with the spur gear 46. When the rack 50 (see Figs. 7 and 8) is moved upward it turns the gear 46 counterclockwise, as viewed in Fig. 8, and swings the mold carrier 30 with the mold part 38 as a unit against the counter-force of the spring 47 from the full line position shown thereof to the dotted line position shown thereof in Fig. 9, whereby the molded article 52 is dropped upon a conveyor 53 or 53ª, later described. When the rack 50 is released, the spring 47 then acts to turn back the gear 46 and the mold carrier 34 with the mold part 38 to the seated position shown in full lines in Fig. 9, while at the same time the gear 46 pushes the rack 50 down to the position shown in Fig. 8. The lower end of the rack is shouldered to seat on the base part of the bracket or saddle 48 (see Fig. 8).

Figure 5:
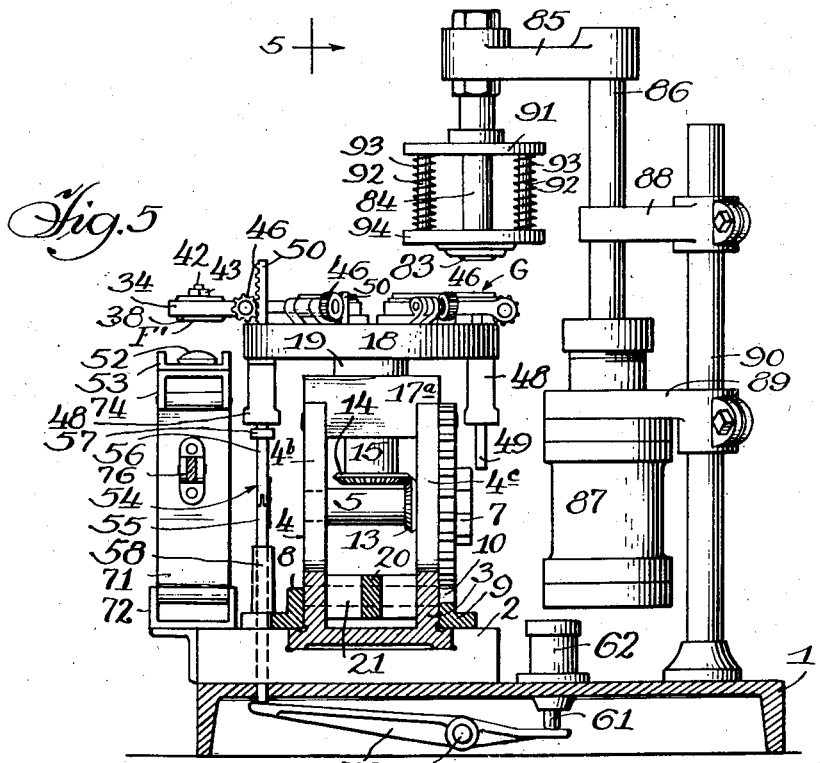
Fig. 5 is a part transverse sectional view and part end elevational view, taken in a plane as represented by line 5—5 in both Figs. 1 and 4 of the drawings.

The means for lifting the rack 50 comprises a lifter device 54, there being one of these at each end of the track 2 in operative relation with the turntables when at their respective ends of the reciprocating stroke of the carriage (see Fig. 1). Each of such means comprises a jointed lifter rod having segments 55 and 56, of which the latter has a head 57 for engaging the lower end of the rack shank 49 when it arrives just over the head 57 (see Fig. 7). The rod part 55 is vertically slidable in a sleeve 58 fixed in position on the top of the track plate 2. The latter and the base 1 are suitably apertured for the passage of the segment 55 to extend downward into contact with an arm of a lever 59 (see Fig. 5) pivoted by way of a fulcrum means 60 secured to and beneath the base 1. The other arm of the lever 59 is acted upon by a piston rod or plunger 61 operatively connected to a pneumatic cylinder means 62 suitably carried by the base 1 (see Fig. 5) at the predetermined instant the means 62 acts to force the plunger 61 down and to rock the lever 59, thus lifting the rod 55—56 and also the rack 50, as shown in Fig. 5, at which time the mold means 34—38 is swung to deliver or dump the molded article 52 on the conveyor 53 or 53ª. Upon the release of air pressure in the cylinder 62, the parts mentioned above return and the mold means is seated on the base plate 30 (see Fig. 9).

Each lifter means 54 has a joint of the "foot rule" type, whereby the joint will open or "break" in only one direction. If for some reason the full descent of the lifter means 54 should not occur when the rack shank 49 leaves the head 57 as the turntable is turned to bring the next rack shank 49 in position to be over the head 57, such next shank 49 (see Fig. 11) may contact the head 57 and the segment 56 will swing, as shown in Fig. 11, so that the next shank 49 can clear and not break or otherwise damage the lifter means. If any such condition should exist in the machine, any suitable type of automatic stop means (not shown) may be so associated with the swinging segment 56 (see Fig. 11) as to stop the operation of the machine and also, if desired, effect a signal for the operator to correct the condition. The segments 55 and 56 carry anchor pins 63 and 64 to which the ends of a spring 65 are connected, the spring having a loop 66 convoluted about the pivot pin 67 of the joint. Normally the spring 65 maintains the segments 55 and 56 in alinement, as shown in Fig. 7, but yields to permit the "breaking" of the joint, as shown in Fig. 11.

There is a molded article conveyor for each turntable, as designated 53 and 53ª in Figs. 1, 2, 3 and 4; these conveyors being downwardly inclined to the left, as shown in Fig. 1, and spacedly held apart by connecting side pieces 68 and 69 so that the conveyors may be reciprocated or oscillated in unison and still be operative with relation to their respective turntables 18 and 18ª. These conveyors are supported on pivoted link struts 70 and 71 (see Fig. 1), pivoted at their lower ends by way of pivot means 72 and 73 secured to the top of the guide plate or track 2, and at the upper ends by way of pivot means 74 and 75 fixed respectively to the under sides of the conveyors 53 and 53ª. To the strut 70 is pivotally connected a reciprocating or oscillating link 76 by way of pivot means 77 fixed to the strut 70, the other end of the link 76 being operatively connected to a crank 78 on a shaft 79 rotative in suitable bearing means 80 and 81 supported on the guide plate 2. The shaft 79 carries a pulley 82 suitably driven by a belt (not shown) from the motive operating part of the machine. The rotating of the crank 78 causes, by way of the link 76, an oscillation or jiggling of the conveyors so as to cause the delivered articles thereon to slide down the conveyors as by impulses, or as by a series of short sliding successive movements, to the lower ends of the conveyors, where the articles are delivered from the conveyors at a receiving locus, such as in a receptacle, or upon another conveyor for carrying them to a "polishing" oven or furnace, or the like (not shown).

Associated with each turntable is a patrix type of molding die means. They comprise the die parts 83 and 83ª which descend and press the plastic material in the matrix mold part 38 then under the patrix die part 83 or 83ª as the case may be. Each patrix molding part 83 or 83ª is carried at the lower end of a plunger 84 secured at its upper end to a cross head 85 carried on a plunger or piston rod 86 operatively connected with a pneumatic device having a cylinder 87 suitably adjustably supported by way of a bracket 89 on a post 90 fixed to the base 1. On the post 90 is also adjustably secured a guiding bracket 88 through which is slidably guided the plunger or piston rod 86. To the plunger 84 is fixed a plate 91 carrying a plurality of rods 92 encompassed by springs 93. Slidable on the plunger 84 and also on the rods 92 is a movable plate 94 which acts as a backing plate for the patrix mold. When the patrix mold descends, this plate 94 will first contact with and come to a stop upon the top of the matrix mold part 38, while the mold part 83 or 83ª will continue to descend further to mold the plastic article in the matrix mold part 38. The plunger 84 and the spring rods 92 will then slide through the plate 94 which is held at rest.

The patrix mold part 83 or 83ª is shown more in detail in Fig. 9. It has the molding part 83ᵇ with the particular contour to give the counterpart configuration on a side of the article being molded. It may have recesses 83ᶜ to form protuberances on the article. Above the mold part 83—83ᵇ the plunger end has a tapered portion 83ᵈ to cooperate with the tapered portion 38ᵇ provided at the top of the matrix molding die part 38, as shown in Fig. 9. If when the patrix die 83 or 83ª on descending should be slightly off center or not coaxial with the matrix die part 38, as illustrated by the center lines 95 and 96 (see Fig. 9), the beveled or tapered portion 83ᵈ will contact the beveled or tapered portion 38ᵇ of the mold die part 38 and the patrix mold die part 83 or 83ª will be laterally shifted to exact coaxial relationship. Besides the tapered portions 83ᵇ and 38ᵇ will also limit the downward movement of the patrix mold die part, thus acting as a gauge and preventing excess displacement of the plastic material of the article being molded.

The molten material from which the articles are made issues at a given or predetermined rate from the usual outlet at the base 97 of the melting means in the form of a gob or mold charge 98, substantially of the shape or form shown in Figs. 1 and 4. It is cut or severed by the shear blades 99 in the usual way. The gob then moves down an inclined chute or trough 100 extending to a funnel 101, where it drops and thence drops from the funnel upon the matrix mold 38 then located directly beneath the funnel. Both the chute 100 and the funnel 101 may be carried on suitable arms 102 and 103 adjustably supported on suitable supports (not shown) on the machine. In this way the chute and funnel may be adjusted in accommodation to the locus of the gob delivering outlet means and the locus of the matrix mold part then in position for receiving the mold charge or gob. In this way the funnel 101 may be adjusted to be exactly centered over the matrix mold part receiving the gob and the chute 100 adjusted to properly transfer the cut or sheared mold charge to the funnel 101.

In operation the gobs 98 of glass or like plastic material are successively formed and sheared in given time relation so as to be delivered by way of the chute 100 and funnel 101 to the matrix molds at predetermined points of time related to the action of the machine. The turntable carriage 3 may be reciprocated by any suitable type of cam which is preferably of the form to cause a dwell or period of rest at each end of the reciprocation of the carriage and parts carried thereby. Also at the same time the conveyors 53 and 53ª are being oscillated or jiggled by way of links 76 and crank 78, etc.

Assuming the parts to be in the position shown in Figs. 1, 2 and 4, and viewing particularly Figs. 1 and 2, the carriage 3 and the turntables 18 and 18ª are at the left hand end of the stroke and at dwell or rest. On the table 18 is an empty matrix mold part 38 at the position A (see Figs. 1 and 2) directly under the funnel 101, which is the position at which the matrix mold part is receiving a gob or mold charge from the funnel. At the same time, another matrix mold part 38 on the turntable 18ª and which contains a previously received gob or mold charge is in position B (see Figs. 2 and 4) directly below the patrix mold part 83ª. The pneumatic means (of any suitable form) is now acting to move the patrix mold part 83ª down to mold the mold charge in that matrix mold part, after which the patrix mold means rises. While this is occurring, a previously molded mold charge which has been carried by the turntable 18ª in the previous stepping around thereof in the direction of the arrows shown on the turntable has reached the position C and has been dumped at the position C' onto the conveyor 53ª (see Fig. 2).

The next action is a reciprocation of the carriage 3 with the parts carried by it to the right to the position shown in Fig. 3. The matrix mold part at the dumping position C' (Fig. 2) returns to its original position on the turntable because the lower end of the rack shank 49 has left the head 57 of the lifter means 54. Looking at Fig. 4 which is a rear view, it will be seen that during this movement or reciprocation (to the left as viewed in Fig. 4) the gear 11ª rides idly on the rack 10 carrying the pawl 12ª to slip over the ratchet 7ª. Thus the turntable 18ª is not turned about its vertical axis, but is simply moved linearly with the carriage 3 to the left (Fig. 4). Hence the article just molded is now at the position D (Fig. 3). The next matrix mold previously at the position E in Fig. 2 is now directly under the funnel 101 (see Figs. 1 and 4) to receive therefrom the next gob or mold charge. The mold part on turntable 18, previously at the position A in Fig. 2 where it received a mold charge, is now in position directly under the right hand patrix mold means 83 (see Fig. 1) where the mold charge is now being molded by the patrix mold die 83, the pneumatic means operating for that purpose at that instant.

The movement of this matrix mold part from position A in Fig. 2 to and under the die 83 in Fig. 3 was effected as follows (referring now to Fig. 4): As the carriage 3 and the parts carried thereby was moved to the left, as viewed in Fig. 4, the riding of the gear 11 on the rack 10 and hence its turning carried the pawl 12 locked with the ratchet wheel 7 and hence caused a turning (see Fig. 5) of the shaft 5 and gears 13 and 15, and hence the turntable 18, in a clockwise direction as indicated by the arrows shown, and as viewed in Figs. 2 and 3, while at the same time there was a linear movement of the carriage 3, etc. Hence the movement of the matrix mold part from the position A in Fig. 2 to and beneath the patrix mold part 83 was cycloidal compounded from a component rotary movement of the turntable and a component linear movement thereof with the carriage 3. In this position of the parts, the matrix mold, which has arrived at the position F, has dumped at position F' upon the conveyor 53 the mold charge it carried (see Fig. 3).

The next movement is a reciprocation to the left from the position shown in Fig. 3 to that shown in Figs. 1 and 2, and to the right to the position shown in Fig. 4. Looking to the latter, it will be seen that the gear 11a as it rides on the rack 10 turns with the pawl 12a locked with the ratchet wheel 7a to cause a turning of the turntable 18a by way of gears 13—15 (see Fig. 5) counterclockwise and in the direction of the arrows, as shown in Figs. 2 and 3. The other gear 11 (see Fig. 4) as it turns causes the pawl 12 to slip on the ratchet 7 and hence the table 18 does not turn but moves linearly only with the carriage 3. Hence the matrix mold with the fresh charge at position A (Fig. 3) has been moved in a path compounded from a rotation of the turntable 18a and a linear movement of the carriage and the turntable, to position B under the patrix mold part 83a, and the matrix mold part on the table 18 now carrying the just molded charge at the position under the patrix mold part 83 has moved merely linearly to position G (Figs. 1 and 2). The empty matrix mold part at position H in Fig. 3 has been moved to position A in Fig. 2 directly under the funnel 101 to receive the next gob. This completes the cycle.

As the turntables are made to turn through given successive angular extents, the lifting racks 49—50 carried thereby successively and eventually arrive over the lifting rods 54 (see particularly Figs. 1 and 7), there being a lifting device 54 for each table 18 and 18a. There is also a lifting or dumping rack 49—50 for each matrix mold. When the rack 49—50 is in alinement with the lifting means 54, the pneumatic means 62 (see Fig. 5) acts in given time relation to actuate the lever 59 and to lift the means 54—49—50, thus causing the corresponding matrix mold to swing and dump the molded article, as shown in Figs. 2, 3, 5 and 9 (in dotted lines in the latter).

The patrix mold means 83—84—85 and 83a—84—85 are angularly adjustable about the axes of the plungers 86, 86 and the pneumatic means 87, 87 carried by the brackets 88 and 89 are adjustable both angularly about and axially of the axes of the posts 90, 90, whereby the position of the patrix molds 83 and 83a may be properly related to the matrix molds when brought into molding positions under the patrix molds.

While I have herein described and upon the drawings shown an illustrative embodiment of the invention, it is to be understood that the invention is not limited thereto but comprehends other constructions, arrangements of parts, details, features, or the like, within the scope of the appended claims.

Having thus disclosed the invention, I claim:

1. A device for automatically molding glass articles comprising a reciprocatory carriage, means for reciprocating the carriage with a time dwell at each end of the reciprocatory stroke thereof, a turntable rotatably carried by the carriage, a series of mold parts on the turntable, slip-drive means operatively associated with the turntable and a fixed part of the device for turning the turntable a given angular extent to move a mold part into molding position in one reciprocatory stroke of the carriage and to slip for the holding of the turntable relatively stationary to the carriage in a reverse reciprocatory stroke of the carriage, a mold device having a complementary mold part for molding an article with the mold part being in the molding position, means for reciprocating said mold device to and from the mold part being in the molding position.

2. A device for automatically molding glass articles comprising a reciprocatory carriage, means for reciprocating the carriage with a time dwell at each end of the reciprocatory stroke thereof, a turntable rotatably carried by the carriage, a series of matrix molds on the turntable, a slip-drive means operatively associated with the turntable and a fixed part of the device for turning the turntable a given angular extent in one reciprocatory stroke of the carriage and to slip for the holding of the turntable relatively stationary to the carriage in a reverse reciprocatory stroke of the carriage, said slip-drive means comprising a rack on said fixed part, and slip-clutch gearing on said carriage and operatively connected to the turntable.

3. A device for automatically molding glass articles comprising a reciprocatory carriage, means for reciprocating the carriage with a time dwell at each end of the reciprocatory stroke thereof, a turntable rotatably carried by the carriage, a series of matrix molds on the turntable, a slip-drive means operatively associated with the turntable and a fixed part of the device for turning the turntable a given angular extent in one reciprocatory stroke of the carriage and to slip for the holding of the turntable relatively stationary to the carriage in a reverse reciprocatory stroke of the carriage, said slip-drive means comprising a rack on said fixed part, and slip-clutch gearing on said carriage and operatively connected to the turntable, and said slip-clutch gearing including a pawl and ratchet wheel means.

4. A device for automatically molding glass articles comprising a reciprocatory carriage, means for reciprocating the carriage with a time dwell at each end of the reciprocatory stroke thereof, a turntable rotatably carried by the carriage, a series of matrix molds on the turntable, slip-drive means operatively associated with the turntable and a fixed part of the device for turning the turntable a given angular extent in one reciprocatory stroke of the carriage and to slip for the holding of the turntable relatively stationary to the carriage in a reverse reciprocatory stroke of the carriage, said slip-drive means comprising a rack on said fixed part, driving means carried by the carriage and operatively connected to the turntable, a rachet connected to said driving means, a rack gear freely rotatable on said driving means and meshing with said rack, and a pawl carried by the rack gear and operatively associated with the rachet.

5. A device for automatically molding glass articles comprising a reciprocatory carriage, means for reciprocating the carriage with a time dwell at each end of the reciprocatory stroke thereof, spaced turntables rotatably carried by the carriage, a series of matrix molds on each turntable, a slip-drive means operatively associated with each turntable and with a fixed part of the device, each slip-drive means having means for turning the respectively associated turntable thereof a given angular extent in one direction of reciprocatory stroke of the carriage for one of said turntables and in the other direction of reciprocatory stroke of the carriage for the other of said turntables, and to slip for the holding of the respective turntables relatively stationary to the carriage in the respective reverse reciprocatory strokes of the carriage.

6. A device for automatically molding glass articles comprising a reciprocatory carriage, means for reciprocating the carriage with a time dwell at each end of the reciprocatory stroke thereof, spaced turntables rotatably carried by the carriage, a series of matrix molds on each turntable, a slip-drive means operatively associated with each turntable and with a fixed part of the device, each slip-drive means having means for turning the respectively associated turntable thereof a given angular extent in one direction of reciprocatory stroke of the carriage for one of said turntables and in the other direction of reciprocatory stroke of the carriage for the other of said turntables, and to slip for the holding of the respective turntables relatively stationary to the carriage in the respective reverse reciprocatory strokes of the carriage, each of said slip-drive means comprising a rack on said fixed part, and slip-clutch gearing on the carriage and respectively operatively connected to the turntable.

7. A device for automatically molding glass articles comprising a reciprocatory carriage, means for reciprocating the carriage with a time dwell at each end of the reciprocatory stroke thereof, spaced turntables rotatably carried by the carriage, a series of matrix molds on each turntable, a slip-drive means operatively associated with each turntable and with a fixed part of the device, each slip-drive means having means for turning the respectively associated turntable thereof a given angular extent in one direction of reciprocatory stroke of the carriage for one of said turntables and in the other direction of reciprocatory stroke of the carriage for the other of said turntables, and to slip for the holding of the respective turntables relatively stationary to the carriage in the respective reverse reciprocatory strokes of the carriage, each of said slip-drive means comprising a rack on said fixed part, and slip-clutch gearing on the carriage and respectively operatively connected to the turntable, each of said slip-clutch gearings including a pawl and ratchet wheel means.

8. A device for automatically molding glass articles comprising a reciprocatory carriage, means for reciprocating the carriage with a time dwell at each end of the reciprocatory stroke thereof, a turntable rotatably carried by the carriage, a series of matrix molds on the turntable, slip-drive means operatively associated with the turntable and a fixed part of the device for turning the turntable a given angular extent in one reciprocatory stroke of the carriage and to slip for the holding of the turntable relatively stationary to the carriage in a reverse reciprocatory stroke of the carriage, each of said matrix molds having a transfer means carried by the turntable and operatively connected to the matrix mold to swing the matrix mold to discharge therefrom the molded article carried thereby, and a lifter carried by the device and located to operate the transfer means in alinement therewith at dwell position of the turntable.

9. A device for automatically molding glass articles comprising a reciprocatory carriage, means for reciprocating the carriage with a time dwell at each end of the reciprocatory stroke thereof, a turntable rotatably carried by the carriage, a series of matrix molds on the turntable, slip-drive means operatively associated with the turntable and a fixed part of the device for turning the turntable a given angular extent in one reciprocatory stroke of the carriage and to slip for the holding of the turntable relatively stationary to the carriage in a reverse reciprocatory stroke of the carriage, each of said matrix molds having a transfer means carried by the turntable and operatively connected to the matrix mold to swing the matrix mold to discharge therefrom the molded article carried thereby, and a lifter carried by the device and located to operate the transfer means in alinement therewith at dwell position of the turntable, said lifter having a spring resisted one-way break joint for relieving interference with a moving part of the turntable.

10. A device for automatically molding glass articles comprising a reciprocatory carriage, means for reciprocating the carriage with a given length of stroke and with a time dwell at each end of the reciprocatory strokes thereof, spaced turntables rotatably carried by the carriage, a circular series of matrix molds on each turntable, a mold charge feeding means located at a given locus above the turntables, said turntables being spaced on the carriage relative to the length of stroke of the carriage to have the paths of movement of the series of matrix molds respectively directly below said locus of the feeding means when the carriage is respectively at its ends of its reciprocatory stroke, spaced patrix type of molding means located respectively over the said matrix mold paths of the respective turntables when the carriage is respectively at its ends of its reciprocatory stroke, and a slip-drive means operatively associated with each turntable and with a fixed part of the device, each slip-drive means having means for turning the respectively associated turntable thereof a given angular extent in one direction of reciprocatory stroke of the carriage for one of said turntables and in the other direction of reciprocatory stroke of the carriage for the other of said turntables, and to slip for the holding of the respective turntables relatively stationary to the carriage in the respective reverse reciprocatory strokes of the carriage.

SELLERS H. PELTIER.